United States Patent [19]

Adkins et al.

[11] Patent Number: 4,814,016

[45] Date of Patent: Mar. 21, 1989

[54] WATERBORNE PENETRATING COATING COMPOSITION AND METHOD

[75] Inventors: Adrian S. Adkins, Moraga; Diane J. Englund, Livermore, both of Calif.

[73] Assignee: The Clorox Company, Oakland, Calif.

[21] Appl. No.: 115,175

[22] Filed: Oct. 30, 1987

[51] Int. Cl.$^4$ .................. C09K 3/00; C08L 91/00; C09D 3/26
[52] U.S. Cl. .................... 106/250; 106/266; 106/34
[58] Field of Search ............... 106/252, 243, 250, 221

[56] References Cited

U.S. PATENT DOCUMENTS

| | | | |
|---|---|---|---|
| 3,951,825 | 4/1976 | Carver | 106/245 |
| 4,072,536 | 2/1978 | Otsuki et al. | 106/244 |
| 4,111,881 | 9/1978 | Paul | 260/29.6 |
| 4,187,204 | 2/1980 | Howard | 523/402 |
| 4,225,477 | 9/1980 | Vasishth et al. | 260/29.2 |
| 4,269,866 | 5/1981 | Gunter et al. | 427/27 |
| 4,276,329 | 6/1981 | Vasishth et al. | 427/393 |
| 4,335,163 | 6/1982 | Wong | 427/256 |
| 4,384,065 | 5/1983 | Wong | 524/322 |

FOREIGN PATENT DOCUMENTS 255406 3/1934 United Kingdom ............... 106/188

OTHER PUBLICATIONS

"Using P-Series Glycol Ethers in Water Reducible Coatings" by R. A. Heckman, reprinted from *Modern Paint and Coatings* (Jun. 1986).

*Primary Examiner*—Theodore Morris
*Attorney, Agent, or Firm*—John A. Bucher

[57] ABSTRACT

Waterborne penetrating coating compositions and a method for applying the coating compositions to wood surfaces are disclosed. The coating compositions include a resin component comprising a first maleinized linseed oil having a low molecular weight in the range of about 1,000 to 3,000, a second maleinized linseed oil having a medium molecular weight in the range of about 4,000 to 8,000 and a medium-long oil length water-reducible alkyd resin, and a solvent component comprising water and propylene glycol tertiary butyl ether (PTB) as a coupling solvent. The coating compositions also preferably include an alkaline solubilizer for neutralizing the resin component and an aliphatic hydrocarbon for controlling evaporation of the solvent component after the coating component is applied to the wood surface.

12 Claims, No Drawings

WATERBORNE PENETRATING COATING COMPOSITION AND METHOD

FIELD OF THE INVENTION

The present invention relates to coating compositions and methods for coating and protecting wood surfaces and more particularly to a waterborne coating composition which penetrates into the wood surface. Waterborne penetrating coating compositions of the invention include but are not limited to clear sealants, semi-transparent stains, solid color stains and deck stains.

BACKGROUND OF THE INVENTION

Penetrating coatings or stains have traditionally been formed as oil based systems having inherently good spreading characteristics for facilitating their application to various wood surfaces.

Application characteristics for these coatings are well understood in the art and are important to assure uniform, protective and esthetic characteristics in the coated wood. In particular, it is desirable that penetrating coatings or stains be provided with suitable rheological characteristics such as "brush drag" for facilitating uniform spreading of the coating on the wood surface by means of a brush, roller, etc. Other characteristics such as drying rate are also important in achieving coating uniformity on the wood surface while also maintaining necessary protective characteristics of the coating after it dries.

As noted above, these various characteristics can readily be assured in oil based systems. However, more recently, water based or waterborne systems have been given greater consideration for a variety of reasons. As a primary consideration, under the Federal Clean Air Act, Air Pollution Control Districts have established local limits for volatile organic compounds. As an example, a maximum limit of 350 grams per liter of volatile organic compounds (VOC) has been established as a maximum limit at least in portions of the state of California, for penetrating coatings of the tYpe toward which the present invention is directed. In eiect, these statutory regulations establish an upper limit for the amount of organic solvents which can be present in such penetrating coatings.

Waterborne coatings or stains have thus become of greater interest as a means for meeting the statutory guidelines. At the same time, waterborne stains provide other desirable advantages which are also common to water based paints and are generally well known, such as ease of clean-up with water and low flammability.

A variety of water based or waterborne coatings are available in the prior art. They commonly employ glycol ethers of a wide variety as a coupling solvent or cosolvent which, together with an alkaline solubilizer or neutralizer, assures solubility of the resin component in the water.

Prior art water based penetrating coatings or stains have also been developed with a variety of resins which are usually of lower molecular weight in order to assure their penetration of wood substrate. Water based penetrating coatings or stains in the prior art commonly include lower molecular weight resins including maleinized linseed oils, alkyd resins, modified alkyds and the like which can be solubilized in water with conventional cosolvents such as the glycol ethers (and alkaline solubilizer) referred to above. For example, Gunter et al., U.S. Pat. No. 4,269,866 is representative of prior art for coating compositions containing a water-dilutable maleinized oil. Vasishth et al., U.S. Pat. No. 4,276,329 disclosed a coating composition for treating and protecting wood surfaces, the composition comprising a low molecular weight alkyd resin in a cosolvent of water and a small amount of glycol ether solvent.

Numerous additional prior art references also have disclosed water based systems. However, such prior art water based systems have generally been incapable of providing equally good application characteristics as the oil based systems referred to above.

Accordingly, there has been found to remain a need for improved penetrating coatings or stain systems. As was initially noted above, penetrating coatings generally include but are not limited to clear sealants, semi-transparent stains, solid color stains and deck stains. Each of these products exhibits certain unique characteristics. For example, clear sealants are specifically characterized by an essential absence of pigment. A semi-transparent stain is contemplated for covering and providing some coloration for the wood surface while allowing the texture and grain of the wood to clearly show through the stain or coating composition. A solid color stain is, in effect, a low solids penetrating paint which allows the wood texture to show through the coating; however, there is usually sufficient pigment to cover or hide the grain of the wood. Finally, a deck stain can be similar to a semi-transparent or solid color stain in terms of pigment quantity and which is relatively fast drying, capable of developing early water resistance and resulting in a durable coating for use on horizontal surfaces normally subject to abrasion from foot traffic and the like.

Additional characteristics of these various specific products are discussed in greater detail below. In any event, a need has been found for improved waterborne penetrating coatings or stains which offer application characteristics more similar to application characteristics for oil based products.

SUMMARY OF THE INVENTION

It is therefore an object of the invention to provide a waterborne penetrating coating composition having improved application characteristics during application to wood surfaces and providing effective protection for the wood surface after application as well as a method of applying such a coating composition.

It is a further object of the invention to provide a waterborne penetrating coating composition for protecting wood surfaces and also to provide a method for applying such a coating composition, the composition comprising a resin component formed from a first maleinized linseed oil having a low molecular weight of about 1,000 to 3,000, a second maleinized linseed oil having a medium molecular weight of about 4,000 to 8,000 and a medium-long oil length water-reducible alkyd resin, and a solvent formed from water and propylene glycol tertiary butyl ether (PTB) as a coupling solvent or cosolvent for solubilizing the resin component in the water and for enhancing application characteristics of the coating composition on wood surfaces.

The coating composition summarized above has been found effective as a protective coating for wood surfaces while also providing enhanced application characteristics. In the resin component, the low molecular weight maleinized linseed oil remains fluid within the stain and easily penetrates into the wood surface. The medium molecular weight maleinized linseed oil on the other hand does not freely penetrate into the wood but tends to remain upon the wood surface and, in effect, bind any pigment in the coating composition to the wood surface. In addition, and particularly in those cases where no pigment is employed within the composition, the medium molecular weight maleinized linseed oil provides enhanced conditioning for the wood surface in conjunction with the low molecular weight maleinized linseed oil. The alkyd resin facilitates early drying characteristics of the coating composition or stain as well as providing early (rapidly developing) water resistance after its application to a wood surface. Thus, these three resin components may be used in varying proportions depending upon the specific type of coating composition or stain being employed to synergistically provide enhanced protection for the wood surface.

The solvent component is formed with propylene glycol tertiary butyl ether or PTB as a coupling solvent or cosolvent in order to more effectively solubilize the resin component in water and at the same time to enhance application characteristics of the coating composition.

It is also a further object of the invention to provide a coating composition as summarized above which further comprises an aliphatic or isoparaffinic hydrocarbon for controlling evaporation of the solvent component after the coating composition is applied to the wood surface to even further enhance application characteristics of the coating composition.

Preferably, the resin component forms about 5 to 25 wgt. % of the coating composition, more preferably about 7 to 20 wgt. % and most preferably about 8 to 17 wgt. %. The solvent component preferably forms about 45 to 95 wgt. % of the coating composition, more preferably about 50 to 90 wgt. % and most preferably about 54 to 89 wgt. % of the coating composition. The PTB cosolvent preferably comprises about 3 to 12 wgt. % of the coating composition, more preferably about 4 to 11 wgt. % and most preferably about 5 to 10 wgt. % of the coating composition. In the resin component, the first maleinized linseed oil preferably comprises about 0 to 10 wgt. % of the coating composition, the second maleinized linseed oil about 0 to 10 wgt. % of the coating composition and the alkyd resin about 2 to 16 wgt. % of the coating composition, one or both of the maleinized linseed oils comprising at least about 2 wgt. % of the coating composition. The first and second maleinized linseed oils are employed in combination within the clear coating, the semi-transparent stains and the solid color stains of the present invention along with the alkyd resin. As for the deck stains, at least one of the maleinized linseed oils and preferably both of the maleinized linseed oils are employed in combination with the alkyd resin. Thus, each of the first and second maleinized linseed oils is recited above as comprising a minimum of 0 wgt. % in the total coating composition.

It is a still further object of the invention to provide the coating composition summarized above for use as a clear sealant wherein the composition comprises substantially no pigment, about 2 to 4 wgt. % of the first maleinized linseed oil, about 2 to 4 wgt. % of the second maleinized linseed oil and about 2 to 4 wgt. % of the alkyd resin.

It is another further object of the invention to provide the coating composition as a semi-transparent stain wherein a pigment component forms about 6 to 9 wgt. % of the coating composition and, in the resin component, the coating composition comprises from about 5 to 8 wgt. % of the first maleinized linseed oil, about 5 to 8 wgt. % of the second maleinized linseed oil and about 4 to 6 wgt. % of the alkyd resin.

It is another further object of the invention to provide the coating composition as a solid color stain wherein a pigment component forms about 20 to 30 wgt. % of the coating composition and the resin component, the coating comprises from about 6 to 10 wgt. % of the first maleinized linseed oil, about 4 to 6 wgt. % of the second maleinized linseed oil and about 3 to 5 wgt. % of the alkyd resin.

It is another further object of the invention to provide the coating composition as a deck stain wherein a pigment component forms about 2 to 4 wgt. % of the coating composition and, in the resin component, the coating composition comprises from about 0 to 2 wgt. % of the first maleinized linseed oil, about 0 to 6 wgt. % of the second maleinized linseed oil and about 10 to 16 wgt. % of the alkyd resin. At least about 2 wgt. % of one or both of the maleinized linseed oils are included with the alkyd resin in a deck stain according to the invention.

Additional objects and advantages of the invention will be made apparent in the following description of the preferred embodiments and specific examples of the invention.

DESCRIPTION OF THE PREFERRED EMBODIMENTS

As summarized above, the present invention is directed toward a waterborne penetrating coating including clear sealants and stains. The penetrating coatings are formed from a blend of oils and/or resins selected to perform synergistically in providing a protective and esthetically appealing coating for the wood surfaces.

The invention also contemplates a cosolvent system for effectively suspending the oils and/or resins in a water medium while providing application characteristics equal to or as close as possible to desirable application characteristics inherent in many prior art oil based systems.

Furthermore, the penetrating coatings of the invention satisfy the statutory requirements for volatile organic components (VOC) which in effect provide an upper limit for organic cosolvents employed in the coating compositions. The penetrating coatings are formed with a cosolvent system of water and an organic coupling solvent or cosolvent, specifically propylene glycol tertiary butyl ether (PTB) for solubilizing the resin component in the water medium and for enhancing application characteristics of the coating composition as it is applied to the wood surface.

In the following description, the development of the penetrating coating system is first summarized followed by a more detailed description of various components of the penetrating coating including a resin component and solvent component which are of greatest importance. Pigments and other components employed within the penetrating coating composition of the invention are also described.

After testing a large number of resins of different types (discussed below in greater detail in connection with the resin component), it was found that a synergistic combination of protective and esthetically appealing properties in a protective coating for wood surfaces could be obtained by means of a blended resin component comprising a first maleinized linseed oil of relatively low molecular weight, a second maleinized linseed oil of higher molecular weight and an alkyd resin of even higher molecular weight.

The basic function for each of these resin components is briefly summarized and discussed in greater detail further below in a resin component description. In any event, the oils and/or resins listed above are employed in an optimized ratio, depending upon the specific type of coating desired, to provide controlled penetration and surface conditioning in a wide variety of wood species and surfaces.

The first maleinized linseed oil, having a low molecular weight in the range of about 1,000 to 3,000, is selected for its ability to penetrate into the wood fiber. The second maleinized linseed oil, having a higher molecular weight in the range of about 4,000 to 8,000, is generally too large to penetrate to any great extent into the wood fibers and accordingly remains on the surface of the wood fibers in order to bind pigment particles to the wood substrate and also to synergistically function with the first low molecular weight maleinized linseed oil for conditioning and protecting the surface of the wood substrate.

It has been found that a reasonably effective waterborne wood stain can be made using only a blend of the two maleinized oils described above. However, the drying time for such a blend was found to be unsatisfactorily slow. Also, a film formed from the two maleinized oils alone tended to show unacceptable water-sensitivity for a number of hours after application.

It is of course obvious that the duration of poor water-resistance is dependent on weather conditions and is accordingly relatively long when humidity is high and/or when ambient temperatures are low. Following application to a wood surface, a penetrating coating or stain having poor water resistance characteristics tends to wash off under conditions of high humidity and condensation or during unexpected rain showers or a thunderstorm, for example. It is generally believed that most competitive prior art waterborne protective coatings or stains tend to demonstrate this serious shortcoming at least to some extent.

It was further discovered that the addition of a carefully determined amount of a compatible, high molecular weight, water-soluble alkyd resin to the blend of the first and second maleinized oils dramatically improved the drying characteristics of the resin system or component. Addition of the alkyd also dramatically shortened the time period during which the coated surface remained water sensitive (the coating being susceptible to resolubilization and undesirably washing off of the wood surface).

The amount of the alkyd resin employed in the resin system or component was further found to be critical in the present invention. Generally, too little alkyd resin was found to be ineffective in improving the initial drying characteristics of the film or surface coating while too much of the alkyd resin tended to interfere with the desired rheological characteristics of the penetrating coating or stain. Thus, with excessive amounts of alkyd resin, application of the penetrating coating to the wood surface became difficult with the coating tending to remain "sticky" during application. Also, it was found that during application of a penetrating coating with excessive alkyd resin, it was difficult to avoid lap marks and an uneven final stained appearance on the wood surface.

With the composition of the resin component being established as described above, the solvent system for the coating composition was then developed in order to maintain desirable application characteristics referred to above as well as necessary VOC limitations. In the course of developing the solvent system for the invention, many organic cosolvents were tested and evaluated for solubilizing the resin component in water. In particular, many glycol ether solvents were evaluated including solvents based on ethylene glycol, diethylene glycol and propylene glycol. More extensively, glycol ether solvents considered in connection with the invention, and found to be inadequate, included propylene glycol methyl ether, dipropylene glycol methyl ether, tripropylene glycol methyl ether, ethylene glycol methyl ether, ethylene glycol ethyl ether, ethylene glycol butyl ether, diethylene glycol methyl ether, diethylene glycol ethyl ether, diethylene glycol butyl ether, propylene glycol propyl ether and propylene glycol butyl ether. Particular consideration was initially directed toward a solvent system including Butyl Carbitol (diethylene glycol mono-butyl ether) and/or Propasol B (propylene glycol mono-butyl ether).

It was subsequently discovered that a relatively newly available glycol ether, propylene glycol tertiary butyl ether (PTB), was most effective in providing a high level of solution clarity and stability coupled with significantly improved brushing and lapping characteristics. The proportion of PTB employed in the solvent component of the penetrating coatings was optimized as described below for achieving resin solubilization and application characteristics consistent with the VOC limitations referred to above.

The preferred PTB cosolvent is a "tertiary" glycol ether while the other glycol ethers listed above tend to be "mono" glycol ethers. This distinction in itself was found to be insufficient for explaining the superior performance of PTB in the present invention. For example, another tertiary glycol ether was described in Paul U.S. Pat. No. 4,111,881. That patent disclosed the use of dipropylene glycol, di-tertiary butyl ether as a coalescing agent in the preparation of water based coating compositions. However, the tertiary glycol ether of the Paul patent is believed unsatisfactory, because of its molecular structure or size, for achieving the desired application characteristics while not interfering with other desirable characteristics such as rapid initial drying rates. To further distinguish the present invention from the teaching of the Paul patent, it is noted that the purpose of a coalescing agent is very different from that of a cosolvent. The coalescing agent fuses together latex particles during film formation to form a water insoluble matrix. On the other hand, a cosolvent is essentially water soluble and cooperates with an alkaline neutralizer or solubilizer as described above for solubilizing a resin component within the water medium.

It is of course possible that other cosolvents could be included in the solvent component together with PTB as an essential ingredient, while not exceeding the VOC limits noted above. For example, other cosolvents such as Butyl Carbitol and/or Propasol B could be combined with PIB to form the cosolvent of the present invention as long as a minimum amount of PTB is included in accordance with the discussion above.

It was also discovered that the addition of an aliphatic or isoparaffinic hydrocarbon such as that available under the tradename ISOPAR from Exxon Corporation provided surprising improvement in the regulation of evaporation from the penetrating coating after its application to a wood surface. Thus, the addition of an isoparaffinic hydrocarbon was found to be particularly desirable within the penetrating coating systems of the invention. Isoparaffinic hydrocarbons of the type contemplated above are described in greater detail within a sales brochure or booklet entitled ISOPAR ®, Lubetext DG-1P, 1984, Exxon Corporation. The isoparaffinic hydrocarbon employed within the coating systems of the present invention is preferably selected to have a vapor pressure in the range of about 0.5 to about 1.0 kPa at 38° centigrade.

The solvent component also preferably includes an alkaline solubilizer or neutralizer, preferably a volatile amine, in order to both neutralize the resin component while also further assisting in solubilizing the resin component in the water medium. The amine solubilizer may be any of a wide variety of amine or ammonia compounds as described for example in an article entitled "Coatings Vehicles of Water Dispersed Drying Oils" by Herbert M. Schroeder, presented at the North Dakota State University Fourth Annual Symposium on New Coatings and New Coatings' Raw Materials, June, 1962.

That reference discussed the use of an appropriate coupling solvent being mutually compatible with a water medium and organic or resin components. A variety of coupling solvents were listed and discussed in the article which also described specific reactions for producing water-dispersable resins including the modification of fatty acids with maleic anhydride to form a low molecular weight resin. Such a resin of course approximates the first maleinized linseed oil of the present invention.

The Schroeder paper further noted that, after maleic modification of the resins, the carboxyl groups formed on the resins could be neutralized with alkali, ammonia or amines to enhance water dispersability of the resin composition. This reference is discussed somewhat at length since it provides a more detailed discussion as to the manner of forming maleinized linseed oils such as those employed within the present invention as well as the use of amine solubilizers and/or neutralizers as further contemplated by the present invention. Accordingly, the Schroeder reference is incorporated herein as though set forth in its entirety.

It would also be possible to employ alkaline neutralizers such as sodium hydroxide or potassium hydroxide. These materials would satisfactorily neutralize the resin component; however, they would not evaporate and would undesirably remain in the coating after its application to the wood surface.

The penetrating coatings of the invention may also include other conventional components such as pigments, drying agents, surfactants, waxes, etc. generally for providing conventional functions within the coating composition.

The penetrating coatings of the invention are contemplated for use either as a clear sealant with substantially no pigment or as a variety of stains systems suitable for use in a variety of applications. As was also discussed above, such stain systems may include, but are not limited to, semi-transparent stains, solid color stains and deck stains.

In any event, it has been found that an effective class of penetrating coatings or stains can be formed in accordance with the summary provided above and as described in greater detail below.

The Resin Component

As noted above, the resin component comprises two maleinized linseed oils of different molecular weight, although both can be considered of relatively low molecular weight in comparison with most resins, and a higher molecular weight alkyd resin having a synergistic effect with the two maleinized linseed oils as noted above.

If one were to plot solids content versus viscosity, especially for the low molecular weight linseed oils, they would tend to demonstrate generally flat or constant viscosity as the coating dries on a wood surface, at least over the time period of interest for achieving proper drying. It is also to be realized that, when such a protective coating or stain is applied to a wood surface, the volatile solvent component either evaporates into the air or penetrates into the wood. It is of particular importance that the coating composition or stain remain "fluid" at least for the first five to ten minutes after application so that the coating can be worked or spread on the wood surface with desirable brushing or application characteristics as referred to above.

The linseed oil blend of the present invention was selected for these reasons and to provide the desired penetration and surface characteristics on the wood while remaining sufficiently fluid to permit desired application characteristics so that the coating may be spread on the surface of the wood and result in a protective and esthetically pleasing coating.

Both the first and second maleinized linseed oils are characterized as long-chain, fatty acids having some degree of unsaturation, such as linoleic or linolenic acid, after being treated with maleic anhydride. The first maleinized linseed oil is formed with a low molecular weight in the range of about 1,000 to 3,000 in order to assure its penetration into the wood surface as noted above. The second maleinized linseed oil has a higher molecular weight in the range of about 4,000 to 8,000, preferably about 4,000 to 6,000 so that it remains a more surface effective resin component while the first maleinized linseed oil penetrates into the wood.

The low molecular weight first maleinized linseed oil, based on its molecular weight, is thus essentially a blend of linseed oil dimers and trimers, noting again that the molecular weight of a linseed oil monomer (a triglyceride of acids) is about 800. In accordance with the present invention, the first oil is maleinized by the addition of maleic anhydride at appropriate sites on the linseed oil molecule. In this regard, the molecular weight of the maleic anhydride is relatively low so that the molecular weight of the resulting oil is dependent primarily upon the linseed oil dimers and/or trimers.

The second maleinized linseed oil, having a molecular weight in the range of 4,000 to 6,000, is more complex in its construction but is still a relatively low molecular weight resin, at least by coatings standards. Because of its molecular weight, the second maleinized linseed oil tends to exhibit properties analogous to heat bodied or dicyclopentadiene treated oil while the first maleinized linseed oil has properties somewhat more analogous to raw linseed oil.

The other element in the resin component is the alkyd resin also referred to above. The alkyd is water-reducible with a molecular weight preferably in the range of 20,000 to 50,000 and more preferably in the range of about 25,000 to 35,000.

The first and second maleinized linseed oils are respectively available from Cargill under the trade nomenclature "7306" and "7307", respectively. At least two examples of alkyd resins meeting the requirements of the present invention are also commercially available from Cargill under the trade nomenclature "7481" and "7416". For greater accuracy, the maleinized linseed oils and alkyd resins are individually referred to by those numbers at least in Table 1 which sets forth specifications for the first and second maleinized linseed oils as well as the two alkyd resins. The two alkyd resins further identified in Table 1 are generally interchangeable. However, the 7416 resin has been found to be particularly desirable for use in deck stain formulations although the 7481 alkyd resin may also be used in such applications. For other penetrating coatings according to the present invention, the two alkyd resins are believed to be generally equivalent.

a resin or oil composition and has a direct correlation to molecular structure, viscosity characteristics and durability characteristics. Generally, a "long oil resin" has a higher percentage of vegetable oil which usually provides a more linear structure with less crosslinking. By contrast, short oil lengths are less linear because there is less long-chain vegetable oil, thus a greater opportunity for cross-linking which tends to result in a product more difficult to brush for the same reasons noted above.

Generally, the oil length values for the alkyd resins employed in the present invention range from about 45% to 75%, preferably from about 50% to about 65%.

The first and second maleinized linseed oils are preferably modified linseed oils as indicated in order to take advantage of preferred characteristics of the linseed oils in coatings. However, it is to be understood that certain other oils can be considered as equivalents for the first

TABLE I

| | Resin Element Specifications | | | |
| --- | --- | --- | --- | --- |
| | Maleinized Linseed Oils | | Alkyd Resins | |
| | 7306 | 7307 | 7481 | 7416 |
| Non-volatile (% wt) | 98.0 min. | 80.0 ± 2.0 | 75.0 ± 2.0 | 80.0 ± 2.0 |
| Acid Value (solids) | 82–92 | 74–84 | 52–58 | 53–58 |
| Color (Gardner) | 8 max. | 14 max. | 11 max. | 8 max. |
| Viscosity (G-H) | W-Y | Z4-Z6 | Z4½-Z6 | Z4-Z6 |
| Weight per gallon (lbs/gal) | 8.1 ± 0.1 | 8.2 ± 0.1 | 8.5 ± 0.1 | 8.5 ± 0.1 |
| Volatile | water | 18.0 PTB 2.0 Ammonia | PTB | PTB |

An alkyd resin according to the present invention, as characterized by either of the examples in Table 1, is a much more complex, cross-linked structure than the maleinized linseed oils. The alkyd resin is selected for inclusion within the coating composition to provide initial fast drying characteristics upon application of the coating to a wood surface in order to get the coating "out of tack" more rapidly while also making the coating more water resistant in a minimum time period.

The alkyd resin in the resin component of the invention also lends long-term durability to the coating since alkyds are inherently more durable than linseed oil. Generally, product durability is directly proportional to molecular weight of the resins, all other things being equal. Thus, it is desirable to employ as high a molecular weight resin as possible while maintaining other desirable or necessary rheological and application characteristics in the coating or stain. However, it is also to be kept in mind that the fast drying character of the alkyd resin also tends to lend a brittle characteristic to the coating, at least for deck stains, so that the combination of the alkyd resin together with the two maleinized oils is particularly important for achieving long-term durability in such a product.

As noted above, a large number of resins or oils were screened in the resin component of the invention on the basis of compatibility with each other while also providing the necessary or desired coating and application characteristics. The combination of the two maleinized linseed oils and the alkyd resin referred to above have been found to represent a blend for the resin component which provides superior application characteristics and coating characteristics in terms of the present invention.

More particularly, although not to be taken as a limiting factor of the invention, the desirable characteristics for the alkyd resin are believed to be based upon its "oil length". The phrase "oil length" is commonly employed to indicate the amount of vegetable oil present in and second linseed oils within the present invention, particularly if economics or availability dictate the need for replacing the linseed oil components. The linseed oils are also selected because of their relative high degree of unsaturation which enhances their drying characteristics within the coatings of the invention.

However, other oils could be used in place of the linseed oils of the present invention even though their use would probably increase the difficulty in formulating the coatings.

Soybean oil exhibits some similar coatings characteristics as linseed oils while not having the same degree of unsaturation. Thus, the linseed oils of the invention could be replaced by soybean oil preferably supplemented with approximately 5 to 10% heat-treated tung oil. Processed tall oil could also be employed in place of soybean oil. However, since it exhibits an even slower drying rate, it would be necessary to supplement the tall oil with even greater amounts of modified tung oil.

Other suitable oils could include dehydrated castor oil. Fish oils could also be used but present a particular problem because of odor. In addition, fish oils exhibit very poor drying characteristics so that they could only be used in relatively small quantities.

Accordingly, although the present invention specifically recites use of a blend of two linseed oils or, in the case of a deck stain, one or the other or both of the linseed oils with an alkyd resin, other oils such as those set forth above are to be considered as equivalents and included within the term linseed oil as employed in connection with the present invention.

Similar variation is possible within the alkyd resin as long as it is selected to have the characteristics referred to above. In particular, it would be possible to replace the alkyd resin with a "modified alkyd" as described, for example, in above noted U.S. Pat. No. 4,276,329 at column 3, line 48 through column 4, line 36. Accordingly, that reference is incorporated herein as though set forth in its entirety for the purpose of defining such modified alkyds. Generally, it is not believed that the use of such modified alkyds would be particularly desirable in the present invention with the possible exception of air-curing acrylics (ACA). In any event, the term "alkyd resin" as employed within the present invention is intended to include equivalents such as those discussed above.

The resin component normally forms about 5 to 25 wgt. % of the penetrating coating, more preferably about 7 to 20 wgt. % and most preferably about 8 to 17 wgt. %. Within the resin component, for forming a variety of penetrating coatings or stain products, the relative amounts for the three oils/resins are approximately 0 to 10 wgt. % of the coating composition for the first maleinized linseed oil, about 0 to 10 wgt. % of the coating composition for the second maleinized linseed oil and about 2 to 16 wgt. % of the coating composition for the alkyd resin.

The respective amounts for the different oils and resins in the resin components is adjusted for particular products. For example, in a clear sealant, the resin component (based on the total coating composition) includes about 2 to 4 wgt. % of the first maleinized linseed oil, about 2 to 4 wgt. % of the second maleinized linseed oil and about 2 to 4 wgt. % of the alkyd resin.

In a semi-transparent stain, the resin component (based on the total coating composition) includes about 5 to 8 wgt. % of the first maleinized linseed oil, about 5 to 8 wgt. % of the second maleinized linseed oil and about 4 to 6 wgt. % of the alkyd resin.

In a solid color stain, the resin component (based on the total coating composition) includes about 6 to 10 wgt. % of the first maleinized linseed oil, about 4 to 6 wgt. % of the second maleinized linseed oil and about 3 to 5 wgt. % of the alkyd resin.

In a deck stain, the resin component (based on the total coating composition) includes about 0 to 2 wgt. % of the first maleinized linseed oil, about 0 to 6 wgt. % of the second maleinized linseed oil and about 10 to 16 wgt. % of the alkyd resin with the proviso that one or both of the linseed oils are included in the composition in the minimum amount of amount 2 wgt. %.

In concluding the discussion of the resin component, it is again noted that, in the clear sealant formulation, the semi-transparent stain and the solid color stain, the two maleinized oils serve the basic functions described above, the alkyd resin promoting early drying and early water resistance as noted above.

The roles of the two maleinized linseed oils and the alkyd resin are somewhat different in the deck stains where the alkyd resin is substantially more important because of the abrasion normally contemplated by foot traffic on the horizontal wood surfaces to which deck stains are applied.

Thus, substantially larger amounts of the alkyd resin are employed in the deck stain formulation. As noted above, this promotes early drying and early water resistance with a corresponding sacrifice in that the large amount of alkyd resin tends to make the deck stain more brittle. Thus, within the deck stain, the larger amount of alkyd resin is maintained while employing smaller quantities of one or both maleinized linseed oils so that they tend to reduce brittleness of the deck stain upon application and provide greater long-term durability in the resulting coating.

Here again, it is theorized that the characteristics of one or both linseed oils to condition the wood surface are important in combination with the alkyd resin for achieving the synergistic effect of reduced brittleness and increased long-term durability as noted above.

The Solvent Component

As noted above, the solvent component for the penetrating coatings or stain products of th invention are in large part a water medium in order to satisfy the statutory VOC requirements and also to realize other inherent advantages of waterborne systems such as those noted above.

Thus, the most important characteristic for the solvent component according to the present invention is the selection of an organic coupling solvent or cosolvent which suitably solubilizes the resin component within the water medium while allowing the resin components to form a protective and esthetically appealing coating as noted above with desired application characteristics.

In general, it is also important to understand that, in products as contemplated by the present invention, the oils and/or resins are not in solution but rather are a dispersion in water. For that reason, it was necessary to find a cosolvent capable of dispersing or "solubilizing" the resins and oils within the water medium. At the same time, it is obvious that these requirements would make it difficult to use high molecular weight resins, at least in any substantial amounts.

Initially, based on extensive testing, it was determined in connection with the present invention that PTB is a superior cosolvent for solubilizing the resin component of the present invention in a water medium. PTB is employed as about 3 to 12 wgt. % of the total coating composition with the remainder of the solvent component being largely water. However, as will be described in greater detail below, other components may also be considered part of the solvent component. More preferably, PTB forms about 4 to 11 wgt. % of the total coating composition and most preferably about 5 to 10 wgt. % thereof.

As was also noted above, the present invention was based upon the discovery that the use of PTB as a cosolvent with water inherently improves "spreading rate" or coverage defined as the area of wood coated per unit volume (e.g., sq. ft. per gallon) and other application characteristics which are generally desirable in such coatings. The above percentages of PTB are also selected primarily for achieving solubilization of the resin component and superior application characteristics.

With the percentage of PTB thus being established, rheological characteristics of the solvent component and more broadly the coating composition are then adjusted to improve the amount of "brush loading" (or the amount of stain or coating which can be lifted out of the can with a brush). Rheological characteristics include values such as "low shear viscosity" and "high shear viscosity". These characteristics can be measured by various instruments and specified for the final product. Low shear viscosity is preferably adjusted in order to achieve brush loading as noted above. High shear viscosity is preferably adjusted for optimizing brush drag.

In developing the present invention, it was further found that a penetrating coating or stain could be developed with other coupling solvents having the same low shear and high shear viscosity characteristics as a coating formulated according to the present invention with PTB. However, it is important to understand that, in accordance with the present invention, PTB is necessary or essential in the penetrating coating or stain in order to achieve the desired spreading and application characteristics discussed above. As also noted above, PTB can be supplemented in coating compositions according to the present invention with other cosolvents, particularly Butyl Carbitol and Propasol B. However, it is important in any event to maintain a minimum amount of PTB as a cosolvent for assuring the desirable application characteristics provided by the present invention. The minimum amounts for PTB cosolvent are set forth above.

Generally, spreading and application characteristics for coatings on wood surfaces are largely subjective. There are of course specific numerical scales for viscosity as noted above but not for various application characteristics. Thus, coatings tend to be rated on these characteristics as being good, fair, poor, etc.

It is possible, however, to approximate or classify application characteristics on the basis of "practical spreading rate" which can be numerically measured for different formulations. In effect, the practical spreading rate measures the amount of coating or stain required for covering a given surface area under practical and similar conditions. However, it has also been found that in conducting spreading rate tests with large numbers of people, even people who are substantially experienced in stain application, there are widely varying differences in technique, etc. Thus, the numerical measurement of spreading rate as noted above is about the only realistic indication for application characteristics. Spreading rate data should also be averaged for a relatively large number of applicators or at least for expert applicators in order to be reliable. With these limitations in mind, it is believed that such spreading rate data can, at least to some degree, exhibit a correlation with desirable application characteristics as noted above.

Further in connection with the question of solubilization of resins within the solvent component, there is an indication that the degree of solubilization can possibly be correlated with solution clarity or isotropic characteristics of the resulting coating formulation. However, it has also been discovered in connection with the present invention that it is possible to get good solution clarity with other glycol ether solvents even though those other solvents do not provide similar desirable application characteristics as achieved with PIB in terms of the present invention.

Microscopic tests including polydispersity and diffusion analyses to date have not clearly demonstrated an incontrovertible direct correlation between solution clarity and superior application characteristics. However, certain differences are observable, particularly in polydispersity. Thus, the physical characteristics of the solvent component or coating composition are not considered the best basis for predicting the superior application characteristics of the invention. Novelty of the present invention is therefore believed to be primarily based on the surprising discovery of specific application characteristics discussed above.

It is noted again that the resin component and the solvent component of a coating composition are the two most important components in connection with the present invention. Generally, the relative amounts of these two components can also be adjusted depending upon the particular product to be formed. Broadly, a penetrating coating composition according to the present invention has about 5 to 25 wgt. % of a resin component and about 45 to 95 wgt. % of a solvent component, those components being otherwise defined as set forth above.

Pigment Component

A pigment component can be included, if desired, within the penetrating coating composition of the present invention, the pigment component being generally in accordance with the prior art. Various types of pigments can thus be employed depending upon desired coloration and specific application. Otherwise, a specific discussion of pigments is not considered of particular concern in connection with the present invention.

Other Components

The most important additional component, as was also noted above, is an aliphatic or isoparaffinic hydrocarbon comprising about 1 to 3 wgt. % of the coating composition for the purpose of regulating the evaporation rate within the coating. Specific examples of such an aliphatic hydrocarbon are the products available under the trademark ISOPAR from Exxon Corporation.

Yet another component, which can also be considered as an element in the solvent component, is an alkaline or preferably amine solubilizer as discussed above comprising any of a broad variety of amines or ammonia compounds, noting again the incorporation by reference of the Schroeder article. Even though the use of such amine solubilizers is well known in the prior art, its inclusion within a coating composition of the present invention has been found to provide superior results both in terms of coating characteristics provided by the resins and also application characteristics, possibly due to enhanced solubilization of the resins because of the amine solubilizer being present.

Miscellaneous Components

Still other conventional components may be included in the coating composition, with the specific identity, amounts and purposes for those components being substantially similar to other prior art coatings. For example, the penetrating coating compositions of the present invention may also include surfactants, dispersants, defoamers, driers, antioxidants, water repellants, mildewcides and wood preservatives.

The present invention is further illustrated and exemplified by experimental work including the following examples.

EXAMPLE I

| WATERBORNE CLEAR WOOD PRESERVATIVE/SEALER | |
|---|---|
| Raw Material | Percent By Weight |
| Water | 82.8 |
| Propylene Glycol t-Butyl Ether (PTB) | 4.9 |
| Resin Solids* | 8.7 |
| Ammonia | 0.6 |
| Additives** | 3.0 |
| | 100.0 |

*Resin Solids
Low Molecular Weight Maleinized Oil - 3.25 Wgt. %
Medium Molecular Weight Maleinized Oil - 3.25 Wgt. %
High Molecular Weight W/R Alkyd Resin - 2.20 Wgt. %
**Includes preservative, anti-foam, water-repellant, mildewcide, wood preservative and drier.

This example illustrates a typical penetrating coating composition which may be characterized as a clear sealant.

The formulation of Example I was found to exhibit superior application characteristics generally similar to prior art oil based stains on wood surfaces and resulted in an effective penetrating coating for preserving the wood while allowing the grain and texture of the wood to be fully visible through the effectively transparent coating.

EXAMPLE II

| WATERBORNE SEMI-TRANSPARENT EXTERIOR WOOD STAIN | |
|---|---|
| Raw Material | Percent By Weight |
| Water | 61.5 |
| Propylene Glycol t-Butyl Ether (PTB) | 8.5 |
| Resin Solids* | 17.0 |
| Pigment | 6.5 |
| Isoparaffinic Hydrocarbon | 2.3 |
| Ammonia | 1.1 |
| Additives** | 3.1 |
| | 100.0 |

*Resin Solids
Low Molecular Weight Maleinized Oil - 6.35 Wgt. %
Medium Molecular Weight Maleinized Oil - 6.35 Wgt. %
High Molecular Weight W/R Alkyd Resin - 4.30 Wgt. %
**Includes dispersant, preservative, anti-foam, water-repellent, mildewcide, wood preservative and driers.

This example illustrates a typical penetrating coating composition which may be characterized as a semi-transparent stain.

The formulation of Example II was found to exhibit superior application characteristics generally similar to prior art oil based stains on wood surfaces and resulted in a semi-transparent coating for the wood surface providing some coloration while allowing both the texture and grain of the wood to be apparent through the coating.

EXAMPLE III

| WATERBORNE SOLID COLOR EXTERIOR WOOD STAIN | |
|---|---|
| Raw Material | Percent By Weight |
| Water | 45.3 |
| Propylene Glycol t-Butyl Ether (PTB) | 9.5 |
| Resin Solids* | 16.3 |
| Pigment | 24.3 |
| Ammonia | 1.9 |
| Additives** | 3.6 |
| | 100.0 |

*Resin Solids
Low Molecular Weight Maleinized Oil - 9.0 Wgt. %
Medium Molecular Weight Maleinized Oil - 4.1 Wgt. %
High Molecular Weight W/R Alkyd Resin - 3.2 Wgt. %
**Includes dispersant, preservative, anti-foam, water-repellent, mildewcide, wood preservative and driers.

This example illustates a typical penetrating coating composition which may be characterized as a solid color stain.

The formulation of Example III was also found to exhibit superior application characteristics generally similar to prior art oil based stains on wood surfaces and to provide a protective coating with heavy coloration tending to mask the grain of the wood surface while still allowinq the texture of the surface to be apparent through the coating.

EXAMPLE IV

| WATERBORNE SEMI-TRANSPARENT DECK STAIN | |
|---|---|
| Raw Material | Percent By Weight |
| Water | 70.2 |
| Propylene Glycol t-Butyl Ether (PTB) | 8.3 |
| Resin Solids* | 15.5 |
| Pigment | 2.0 |
| Ammonia | 1.2 |
| Additives** | 2.8 |
| | 100.0 |

*Resin Solids
Low Molecular Weight Maleinized Oil - 1.0 Wgt. %
Medium Molecular Weight Maleinized Oil - 3.0 Wgt. %
High Molecular Weight W/R Alkyd Resin - 11.5 Wgt. %
**Includes dispersant, preservative, anti-foam, water-repellent, mildewcide, wood preservative and driers.

This example illustrates a typical penetrating coating composition which may be characterized as a deck stain.

EXAMPLE V

| WATERBORNE SEMI-TRANSPARENT DECK STAIN | |
|---|---|
| Raw Material | Percent By Weight |
| Water | 70.2 |
| Propylene Glycol t-Butyl Ether (PTB) | 8.3 |
| Resin Solids* | 15.5 |
| Pigment | 2.0 |
| Ammonia | 1.2 |
| Additives** | 2.8 |
| | 100.0 |

*Resin Solids
Medium Molecular Weight Maleinized Oil - 4.0 Wgt. %
High Molecular Weight W/R Alkyd Resin - 11.5 Wgt. %
**Includes dispersant, preservative, anti-foam, water-repellent, mildewcide, wood preservative and driers.

The formulations of Examples IV and V were also found to exhibit superior application characteristics generally similar to prior art oil based stains while providing coatings exhibiting early drying and water resistance and also providing durable coatings with coloration on the wood surface. Example IV includes a resin system with two maleinized oils and an alkyd resin while Example V includes a resin system with one maleinized oil and an alkyd resin.

Examples I-V illustrate the basic types of clear sealants and stain products which can be formed in accordance with the present invention. However, variations in different components or elements of the coating composition are possible in accordance with the present invention. For example, each of Examples I through V could be repeated with variations including different amounts of PTB as set forth above and also replacement of a portion of the PTB with one or more different cosolvents, particularly Butyl Carbitol and Propasol B. It is of course apparent that a wide variety of pigment systems could be employed within the formulations of Examples I-V.

The deck stain formulation of Example V could also be repeated with the resin component including the alkyd resin and the low molecular weight maleinized linseed oil.

All of the above variations, based either upon actual testing or comparison with Examples I through V, are believed to represent formulations which would also provide superior application characteristics generally similar to prior art oil based stains while providing effective coatings for wood surfaces which are fast drying and durable.

The method of the present invention is believed obvious from the preceding description but is briefly described below to assure a complete understanding of the invention.

In use, the formulation from any of the preceding examples or variations is applied to a wood surface to be preserved and/or enhanced by any suitable method such as brushing, rolling, etc. The superior application characteristics of penetrating coatings formulated according to the invention are particularly important in facilitating application to the wood surface and assuring formation of a durable, fast drying and early moisture resistant coating.

Thus, there has been described a novel penetrating coating composition and method of application for such a composition to wood surfaces with a number of variations and modifications being set forth descriptively or by way of examples. However, the scope of invention is defined only by the following appended claims.

What is claimed is:

1. A waterborne penetrating coating composition for coating and protecting wood surfaces, consisting essentially of
    a resin componenet forming about 5 to 25 wgt. % of the coating composition, the main component comprising a first maleinized linseed oil having a low molecular weight in the range of about 1,000 to 3,000, a second maleinized linseed oil having a medium molecular weight in the range of about 4,000 to 8,000 and a medium-long oil length water-reducible alkyd resin,
    a solvent component forming about 45 to 95 wgt. % of the composition, the solvent component comprising water and propylene glycol tertiary butyl ether (PTB) as a coupling solvent for solubilizing the resin component in the water and for enhancing handling characteristics of the coating composition as it is applied to the wood surface, and
    a pigment component forming about 0 to 25 wgt. % of the coating composition.

2. The coating composition of claim 1 comprising about 3 to 12 wgt. % PTB.

3. The coating composition of claim 2 comprising about 0 to 10 wgt. % of the first maleinized linseed oil, about 0 to 10 wgt. % of the second maleinized linseed oil, at least about 2 wgt. % of one or both maleinized linseed oils and about 2 to 16 wgt. % of the alkyd resin.

4. The coating composition of claim 3 for use as a clear sealant and comprising about 0 wgt. % pigment, about 2 to 4 wgt. % of the first maleinized linseed oil, about 2 to 4 wgt. % of the second maleinized linseed oil and about 2 to 4 wgt. % of the alkyd resin.

5. The coating composition of claim 3 for use as a semi-transparent stain and comprising about 6 to 9 wgt. % pigment, about 5 to 8 wgt. % of the first maleinized linseed oil, about 5 to 8 wgt. % of the second maleinized linseed oil and about 4 to 6 wgt. % of the alkyd resin.

6. The coating composition of claim 3 for use as a solid color stain and comprising about 20 to 30 wgt. % pigment, about 6 to 10 wgt. % of the first maleinized linseed oil, about 4 to 6 wgt. % of the second maleinized linseed oil and about 3 to 5 wgt. % of the alkyd resin.

7. The coating composition of claim 3 for use as a deck stain and comprising about 2 to 4 wgt. % pigment, about to 2 wgt. % of the first maleinized linseed oil, about 0 to 6 wgt. % of the second maleinized linseed oil, at least about 2 wgt. % of one or both maleinized linseed oils and about 10 to 16 wgt. % of the alkyd resin.

8. A waterborne penetrating coating composition for protecting wood surfaces, comprising
    a resin component comprising a first maleinized linseed oil having a low molecular weight in the range of about 1,000 to 3,000, a second maleinized linseed oil having a medium molecular weight in the range of about 4,000 to 8,000 and a medium-long oil length water-reducible alkyd resin,
    a solvent component comprising water and propylene glycol tertiary butyl ether (PTB) as a coupling solvent for solubilizing the resin component in the water and for enhancing handling characteristics of the coating composition as it is applied to the wood surface, and
    an isoparaffinic hydrocarbon in an amount selected for controlling evaporation of the solvent component after the coating composition is applied to the wood surface.

9. The coating composition of claim 8 wherein the isoparaffinic hydrocarbon comprises about 1 to 3 wgt. % of the coating composition.

10. The coating composition of claim 8 wherein the resin component forms about 5 to 25 wgt. % of the coating composition and the solvent component forms about 45 to 95 wgt. % of the coating composition.

11. The coating composition of claim 8 comprising about 0 to 10 wgt. % of the first maleinized linseed oil, about 0 to 10 wgt. % of the second maleinized linseed oil, at least about 2 wgt. % of one or both maleinized linseed oils and about 2 to 16 wgt. % of the alkyd resin.

12. The coating composition of claim 11 wherein the isoparaffinic hydrocarbon comprises about 1 to 3 wgt. % of the coating composition.

* * * * *

UNITED STATES PATENT AND TRADEMARK OFFICE
CERTIFICATE OF CORRECTION

PATENT NO. : 4,814,016

DATED : March 21, 1989

INVENTOR(S) : Adkins et al.

It is certified that error appears in the above—identified patent and that said Letters Patent is hereby corrected as shown below:

Column 1, line 41: Change "tYpe" to --type--.

Column 1, line 42: Change "efiect" to --effect--.

Column 6, line 62: Change "PIB" to --PTB--.

Column 7, line 60: Change "stains" to --stain--.

Column 8, line 48: Change "ln" to --In--.

Column 11, line 43: Delete "amount", second occurrence thereof.

Column 11, line 68: Change "suriace" to --surface--.

Column 12, line 7: Change "th" to --the--.

Column 12, line 33: Change "as" to --at--.

Column 15, line 50: Change "1.9" to --1.0--.

Column 15, line 67: Change "allowinq" to --allowing--.

Column 17, line 27: Change "componenet" to --component--.

Signed and Sealed this

Fifth Day of February, 1991

Attest:

HARRY F. MANBECK, JR.

*Attesting Officer*     *Commissioner of Patents and Trademarks*